Figure 1:
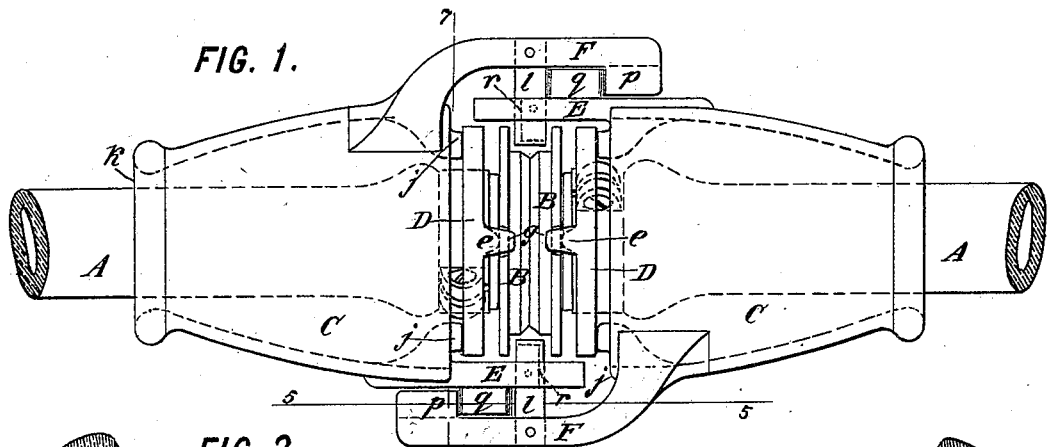

(No Model.) 5 Sheets—Sheet 1.

F. W. WRIGHT.
HOSE COUPLING.

No. 449,789. Patented Apr. 7, 1891.

WITNESSES:
John Becker
Fred White

INVENTOR:
Frederick W. Wright,
By his Attorneys,
Arthur C. Fraser & Co.

THE NORRIS PETERS CO., PHOTO-LITHO., WASHINGTON, D. C.

(No Model.) 5 Sheets—Sheet 2.
F. W. WRIGHT.
HOSE COUPLING.
No. 449,789. Patented Apr. 7, 1891.
FIG. 5.
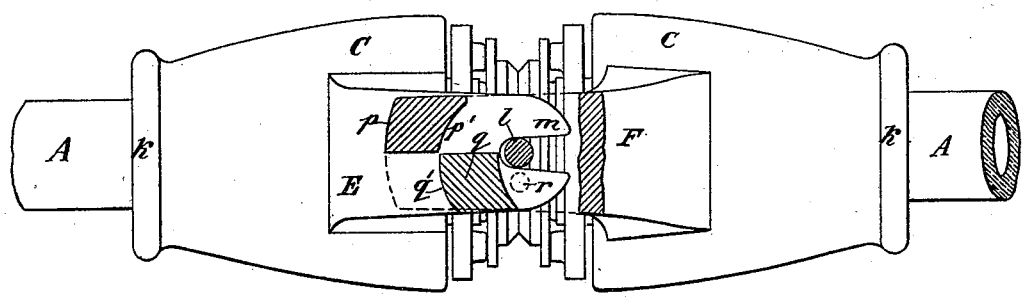
FIG. 6.
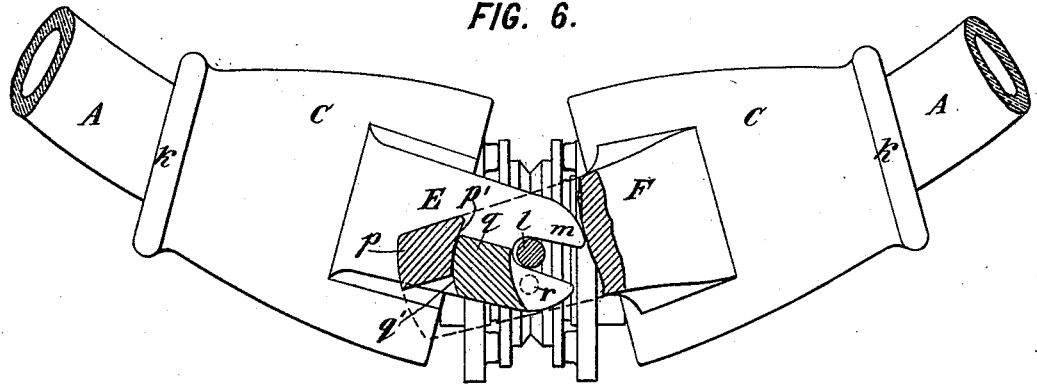
FIG. 9. FIG. 7. FIG. 8.
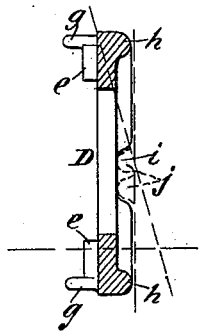 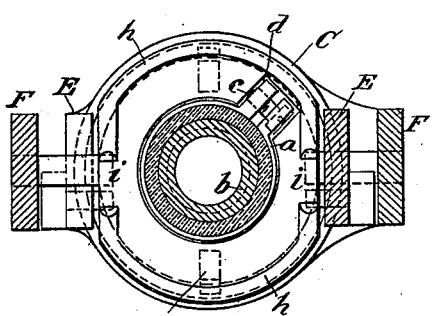 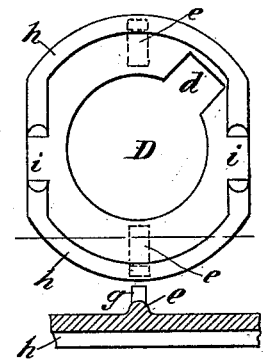
WITNESSES:
John Becher
Fred. White
INVENTOR:
Frederick W. Wright
By his Attorneys,
Arthur C. Fraser & Co.

(No Model.) 5 Sheets—Sheet 3.

F. W. WRIGHT.
HOSE COUPLING.

No. 449,789. Patented Apr. 7, 1891.

WITNESSES:
John Becker
Fred White

INVENTOR:
Frederick W. Wright
By his Attorneys,
Arthur G. Fraser & Co.

(No Model.) 5 Sheets—Sheet 4.

F. W. WRIGHT.
HOSE COUPLING.

No. 449,789. Patented Apr. 7, 1891.

WITNESSES:
John Becker
Fred White

INVENTOR:
Frederick W. Wright,
By his Attorneys,
Arthur E. Braser & Co.

(No Model.)  5 Sheets—Sheet 5.

F. W. WRIGHT.
HOSE COUPLING.

No. 449,789.  Patented Apr. 7, 1891.

WITNESSES:
John Becker
Fred White

INVENTOR:
Frederick W. Wright,
By his Attorneys,
Arthur E. Frazer & Co.

UNITED STATES PATENT OFFICE.

FREDERICK W. WRIGHT, OF NEW YORK, N. Y.

HOSE-COUPLING.

SPECIFICATION forming part of Letters Patent No. 449,789, dated April 7, 1891.

Application filed September 24, 1890. Serial No. 365,967. (No model.)

*To all whom it may concern:*

Be it known that I, FREDERICK W. WRIGHT, a citizen of the United States, residing in the city, county, and State of New York, have invented certain new and useful Improvements in Hose-Couplings, of which the following is a specification.

This invention relates to couplings for hose or flexible pipes, being especially adapted and designed for coupling together the ends of steam-heating pipes or air or fluid pressure brake pipes used on railway-cars. Hose or pipe couplings of this class as heretofore constructed have been of two kinds—first, those in which there is a direct passage, the seating-faces of the couplings meeting in a plane substantially perpendicular to the general direction of the hose or pipe at the junction, and, second, those having a circuitous passage, the seating-faces being in a plane approximately parallel with the axes of the hose or pipes adjacent to their junction. The direct passage is preferable, on account of affording less resistance to the passage of a stream of air or gas; but of the couplings heretofore constructed those operating on the principle of a lateral meeting of the seating-faces have been most acceptable in practice, because of their greater certainty of action in coupling and uncoupling and their stronger and more simple construction as compared with couplings of the class first referred to. These mechanical advantages have usually been considered to more than offset the disadvantage of the circuitous passage for the fluid through the coupling.

My invention is designed to produce a coupling affording a direct passage for the fluid which shall be free from the mechanical disadvantages heretofore inherent in such couplings, shall afford a tight joint between the seating-faces capable of withstanding fluid-pressure without leaking, shall be free from wear at the seating-faces such as would be apt to give rise to leaks, and shall be as easy to couple and as certain in its automatic uncoupling action as the couplings heretofore made having lateral seating-faces.

To this end, according to my invention, I provide the lengths of hose or flexible pipe to be coupled together with seats attached to their ends in planes approximately perpendicular to the axes of the pipes, and I provide coupling-sections connected to the seats, but movable angularly relatively thereto after the manner of levers. These coupling-sections are adapted to interengage at their inner or adjacent ends, and at their outer or remote ends they engage or embrace the respective lengths of hose, so that being put together while in line with one another they are by the act of dropping the coupling down into the pendent position commonly occupied by hose-couplings on railway-cars caused to assume angular positions relatively to one another. Their engaging faces or members are so constructed relatively that by means of this angular movement the two lever-like coupling-sections are drawn mutually together with a considerable degree of leverage or mechanical advantage, and they are so connected to their respective seats that in the act of thus drawing together they exert a pressure against the rear or outer sides of the seats in such direction as to force each toward the other in such manner that when the coupling is dropped to its lowest position the faces are pressed together with the requisite pressure to hold them firmly in contact against the fluid-pressure within the pipes. The interengaging parts or members of the respective coupling-sections may be constructed according to any manner heretofore in use for drawing together the sections of couplings—such, for example, as by inclined or wedging surfaces upon the respective sections, or by interposed links or hooks—the only essential being that the two coupling-sections shall be drawn forcibly together as the coupling is dropped from the position of alignment to its lower or pendent position.

Figure 2:
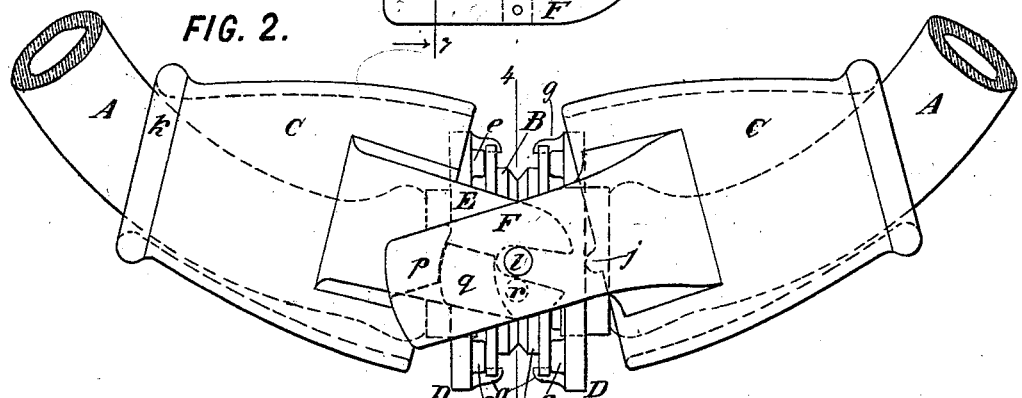
Figure 3:
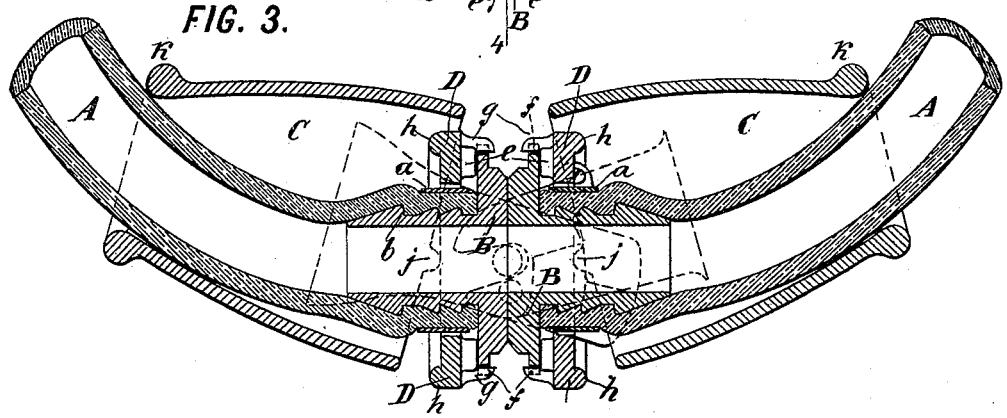
Figure 4:
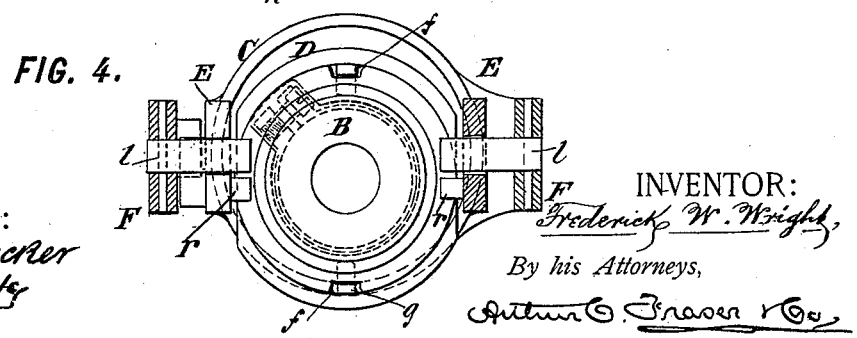

Figure 1 of the accompanying drawings is a plan view of the two couplings constructed according to my invention, united in alignment, but not yet drawn together by being dropped. Fig. 2 is a side elevation thereof in the normally-locked position. Fig. 3 is a vertical longitudinal mid-section thereof in the locked position. Fig. 4 is a vertical transverse section cut between the seating-faces, as denoted by the line 4 4 in Fig. 2. Fig. 5 is a side elevation, partly in section on the line 5 5 in Fig. 1, showing the couplings in alignment but not yet locked together. Fig.

Figure 10:
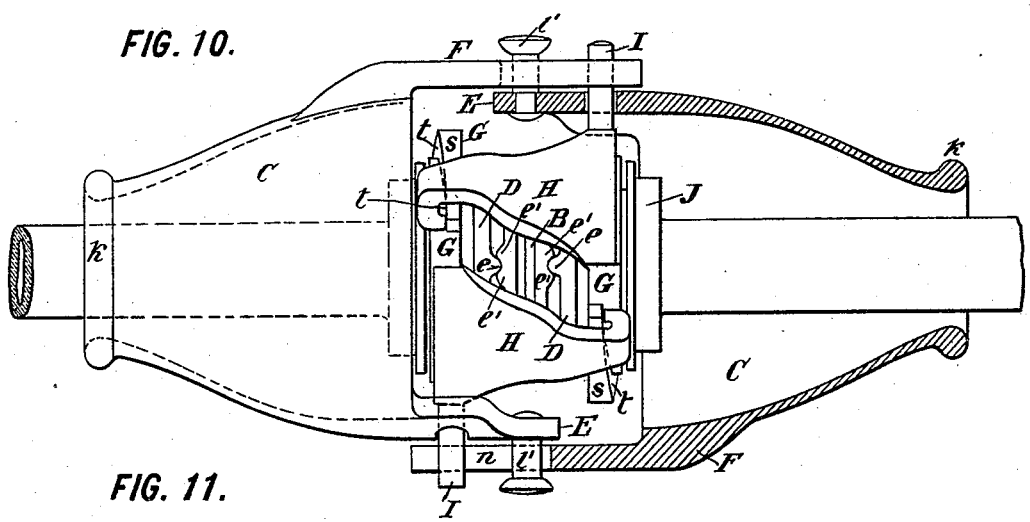
Figure 11:
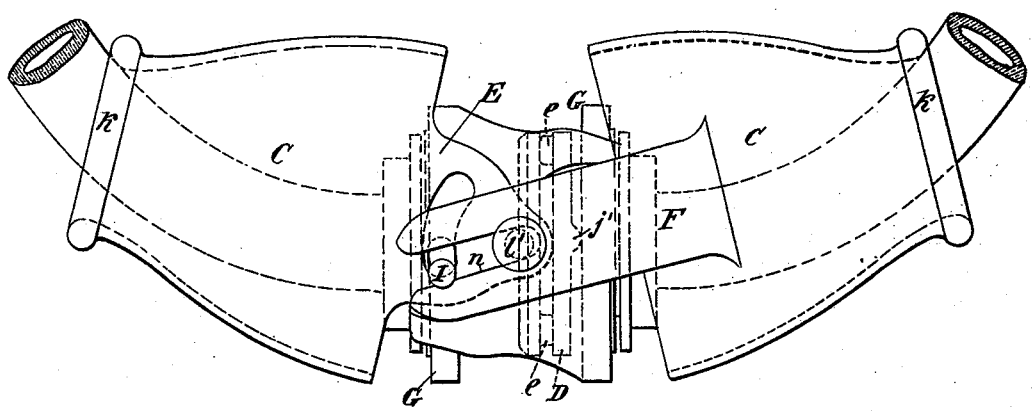
Figure 12:
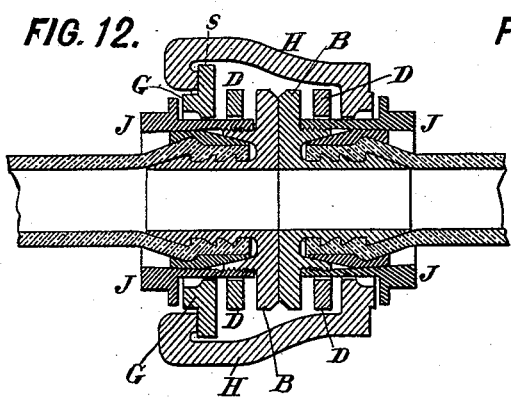
Figure 13:
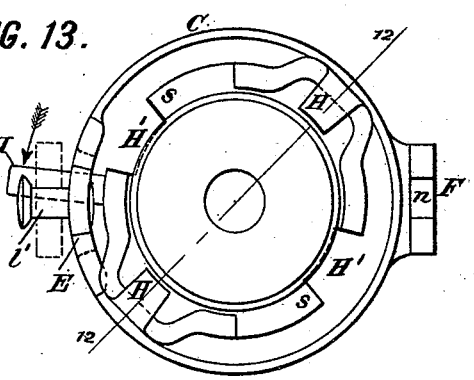
Figure 14:
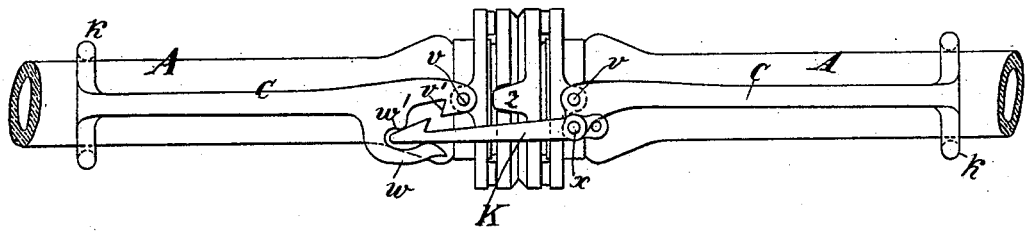
Figure 15:
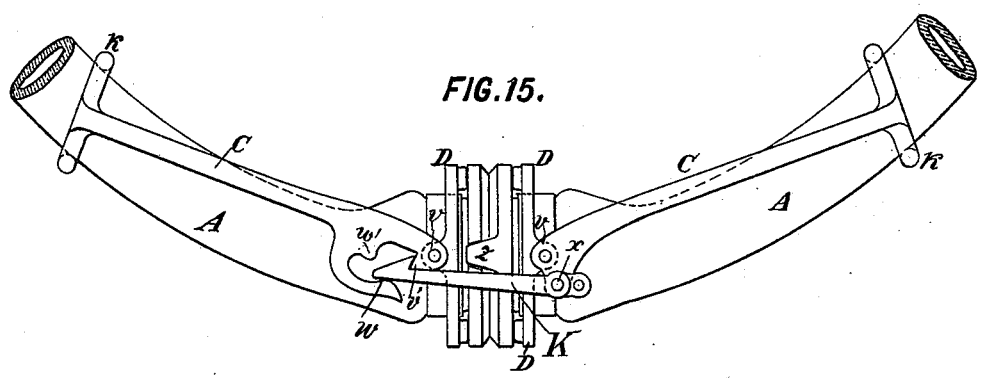
Figure 16:
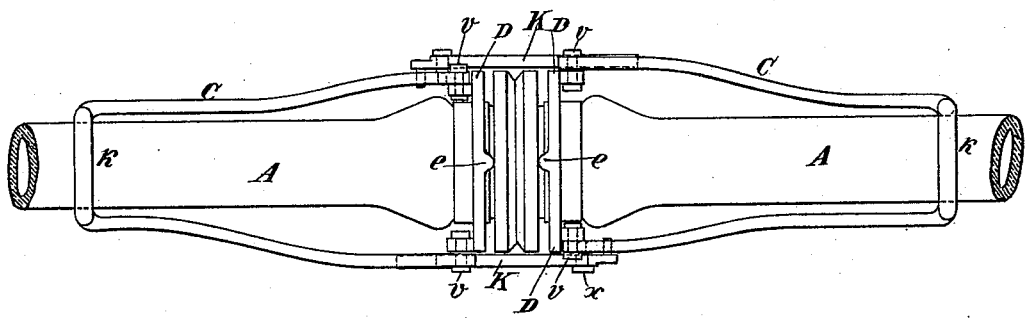
Figure 17:
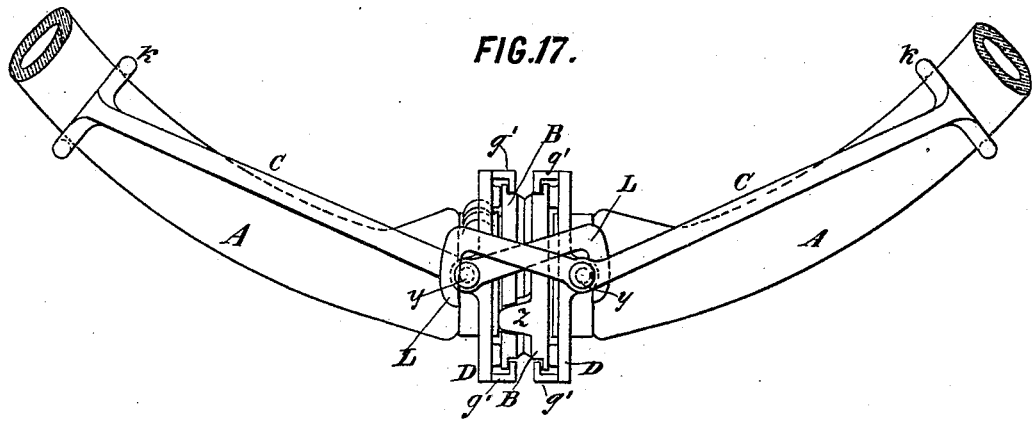
Figure 18:
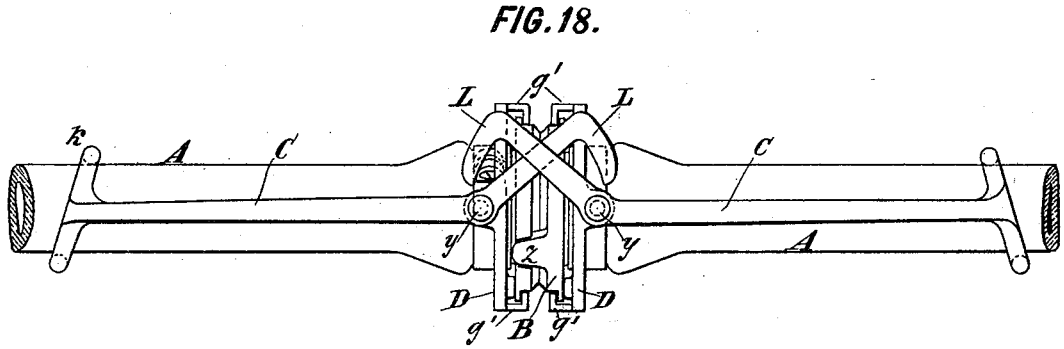
Figure 19:
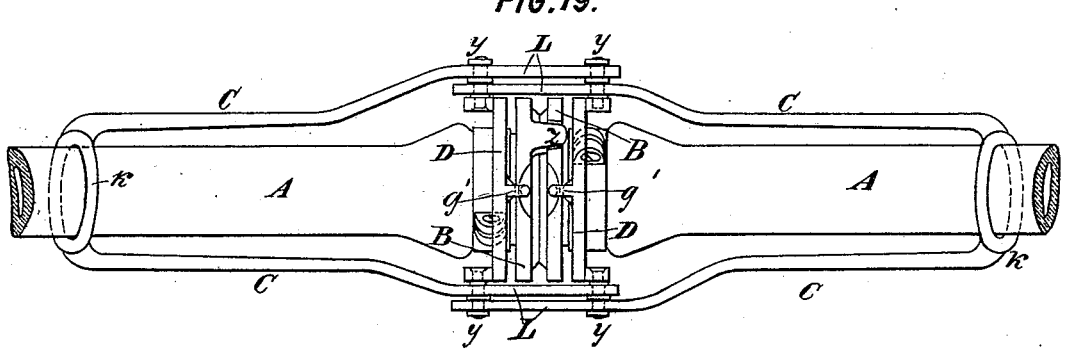

6 is a side elevation in section in the same plane as Fig. 5, showing the couplings dropped and interlocked. Fig. 7 is a transverse section in the plane of the line 7 7 in Fig 1. Fig. 8 is a rear elevation, and Fig. 9 a vertical transverse section, of one of the distributing-rings. The remaining views illustrate modifications. Fig. 10 is a plan view of one modified construction, one of the coupling-sections being shown in horizontal mid-section. Fig. 11 is a side elevation thereof, showing the coupling locked. Fig. 12 is an oblique section of the coupling-heads in the plane of the line 12 12 in Fig. 13. Fig. 13 is an end view of one coupling-head. Figs. 14, 15, and 16 are respectively a side elevation uncoupled, a side elevation coupled and locked, and a plan of a further modification. Figs. 17, 18, and 19 are respectively a side elevation coupled and locked, a side elevation unlocked, and a plan of another modification.

I will first describe the construction shown in Figs. 1 to 9, inclusive, which is the preferred embodiment of my invention.

Let A A designate the respective lengths or sections of flexible hose to be coupled together, B B the seats applied to the ends thereof, and C C the respective coupling-sections. The seats B are shown as consisting of flat disks of hard metal, preferably steel, with their outer faces finished in a true plane, so as to fit together face to face with a tight joint. They are attached to the hose in any suitable way, of which several are known in the art. The method shown consists of a tubular shank or thimble $b$, cast on the rear side of each seat, over which the end of the flexible hose is drawn and against which it is clamped by a band $a$, which is open at one side and formed with ears or lugs drawn together by a screw $c$, as shown best in Fig. 7. The outer surface of the shank $b$ is made with projecting ribs or lugs to indent and enter the soft material at the hose in order to engage securely therewith. A distributing-ring D is applied around the hose back of the seat B, this ring being formed with a notch $d$, Fig. 8, at one side to admit the lugs and screw of the band $a$. This distributing-ring is formed with diametrically-opposite lugs or rockers $e$, as shown in the section beneath Fig. 8, which rest against the rear face of the seat B. The displacement of the ring relatively to the seat is prevented by notches $f$, formed in the flange of the seat at diametrically-opposite sides, which are entered by projecting fingers $g$ at the ends of the lugs $e$ $e$. The rear side of the ring is preferably formed with a strengthening flange or rib $h$, which is interrupted on diametrically-opposite sides to form notches or spaces $i$ $i$, into which project lugs $j$ $j$, formed on diametrically-opposite sides of the coupling-sections C C and projecting within them, as shown in dotted lines in Fig. 9.

The coupling-sections C C are essentially levers intersecting one another preferably and approximately in the plane of the meeting faces of the seats and relatively fulcrumed at their intersections. Their short arms adjacent to their fulcra are formed with wedging inclines by which to draw them together as they are dropped from the position shown in Fig. 5 to that shown in Fig. 6. Their long arms extend to either side of the seats and are formed with rings or openings $k$ $k$, which embrace the hose at a suitable distance back from the seating-faces. In the act of dropping the coupling the hose by being flexed bears against the inner and upper sides of these rings or openings, as shown in Fig. 3, and thereby insures the tilting of the coupling-sections and maintains them tilted.

In the construction shown each coupling-section C is formed with a short arm E projecting forwardly from it on one side and close outside of the seat B and distributing-ring D. It is also formed with a longer arm F projecting forwardly from the opposite side and arranged farther from the center, so as to pass outside of the arm E on the opposite coupling-section. The arm F carries a centering or guiding pin $l$, projecting inwardly, and the arm E is formed with a notch $m$, which receives this pin as the coupling-sections are brought together in the manner shown in Fig. 5. The pins $l$ $l$ thus form the fulcra on which the sections or levers rock in the act of locking. The arm F is formed with a projection $p$ on the inner side of its end, which constitutes, virtually, a hook, and which in putting together the two sections slides freely past a projection $q$ on the upper side of the arm E, as shown in Fig. 5, the hook $p$ being formed above and the projection $q$ below the mutual medial line of the two sections. The outer face $q'$ of the projection $q$ and the inner face $p'$ of the projection $p$ are curved eccentrically to the common center or fulcrum of the coupling-sections, so that as the sections are inclined or tilted in dropping to the position shown in Fig. 6 these faces shall wedge tightly together and draw the sections toward one another. By this movement the coupling is locked. The movement of the sections C C toward one another exerts a pressure through their lugs $j$ $j$ against the opposite sides of the distributing-rings D D, these lugs rocking against the rings and constituting, essentially, a pivotal connection therewith on diametrically-horizontal axes. The rings transmit this pressure to the seats B B through their lugs $e$ $e$, which rock against the rear faces of the seats, thereby constituting, essentially, pivotal connections therewith on diametrically-vertical axes. Any inequality in the pressure exerted by the respective lugs $j$ $j$ is compensated for by the slight tilting of one or other of the rings D D on a vertical axis and is equally divided between the lugs $e$ $e$, which thus transmit an equal pressure to the seats B B, any inequality being compensated for by the tilting of one or both of the rings D on a horizontal axis. Thus the pressure is equally distributed over all portions of the seats, which are consequently pressed together with an even pressure and, being made with two flat faces, form a tight and perfect fit. The equalizing action of the distributing-rings enables the couplings to be put together as they are cast without any finishing, except on the seating-faces and the eccentric wedging-faces $q'$ $p'$, any irregularities of the castings being taken up by the tilting movements of the distributing-rings.

The coupling is coupled by the train-hand, who takes one coupling-section C in each hand, holds them axially in line, and brings them together end to end until the pins $l$ enter the notches $m$ and the two seats come together. He then drops the coupling, tilting the sections C C forcibly by his hand, in doing so, or relying on gravity to tilt them, which brings them to the position shown in Fig. 6. The coupling will remain firmly locked together in this position until uncoupled, since the weight of the coupling is borne almost wholly by the sections C C, which rest at their ends $k$ $k$ on the hose, so that the whole tendency of the weight of the coupling is to maintain it coupled and, in fact, to wedge the coupling-sections together more tightly. The coupling may be uncoupled by hand, or it will uncouple automatically upon the pulling apart of the cars. In thus uncoupling the first effect is to pull the two lengths of hose A A into a straight line, as shown in Fig. 5, thereby tilting the coupling-sections to the position there shown, whereby the interlocking faces $p'$ $q'$ are moved out of coincidence, so that upon reaching the position of alignment shown in Fig. 5 they slip past each other and the sections fall apart.

The separate parts of the coupling-head are kept together in proper position by means of the pins $l$, projecting inwardly from the arm F and entering in front of the flange on the seat B at one side, while at the other side thereof another pin $r$ projects inwardly from the arm E in front of this flange. The section C is thus kept from sliding backward more than a certain distance beyond the seat. The ring D is kept from sliding backward by the abutment of the hooks $j$ $j$ on the section C and is kept from twisting or rotative displacement either by the notch $d$ engaging the lugs on the band $a$ or by the projecting fingers $g$ $g$ engaging the notches $f$ $f$ in the flange of the seat. Either one of these two means may be omitted, if desired. The rotative displacement of the section C is prevented by its lugs $j$ being engaged by the notch $i$, each lug having a movement in the notch to the extent indicated by the dotted lines in Fig. 9, but no farther.

The modified construction shown in Figs. 10 to 13 operates in a somewhat different manner. The seat B is constructed and attached to the hose in substantially the same manner, and the ring D is arranged behind the seat to engage it in substantially the same manner. A separate ring G is mounted back of the ring D and is arranged somewhat loosely, so that it may rock against the ring D on projections $j'$, Fig. 11, formed on the rear of the latter. The ring G is formed with two diametrically-opposite arms H H, arranged normally obliquely and projecting forward beyond the seating-face sufficiently to engage the rear of the ring G on the opposite coupling-head. Each ring G is formed with notches H' H' to admit the hooked ends of the arms H of the other coupling-head. The hooks reciprocally enter through these notches in the act of putting the two heads together, and in the act of dropping the coupling down to the lower position the two rings G G are partially rotated or oscillated. During this movement a flange $s$ on each ring moves into engagement with the hooked end of the arm H of the other ring. This flange (of which there are two to each ring) is formed with its outer face $t$ inclined, so that in its oscillatory movement this incline engages the hooked end of the arm and draws it backward. This action draws the two rings G G toward each other, thereby forcing the intervening rings D D and seats B B into firm contact. The oscillatory movement of the rings G G is imparted to them through the coupling-sections C C, which constitute, essentially, levers, as in the first construction. These sections are preferably formed as hollow shells embracing the hose and having arms E and F, as before, except that the arms E serve solely to carry fulcruming-pins $l'$, which are engaged by deep slots $n$ in the arms F. Each of these slots also engages at its outer portion with the pin I, projecting radially and rigidly from the ring G of the other coupling-head. The heads being brought together in alignment, the forked arms F F are slipped over, first, the pin $l'$, and then the pin I on the other coupling-head, and by moving the coupling to the lower position the inclination of the coupling-sections C C, acting through their forked arms F F, thrusts down the arms I I, and thereby correspondingly oscillates the rings G G to draw the respective seats together.

In the construction shown the ring G is guided on a thimble or tube J, screwed onto the rear of the seat B and having a flange which comes behind the ring G to prevent rearward displacement of the latter. The oscillation of the ring G is limited by the pin I working through a slot in the arm E of the section C. The oscillatory displacement of the ring D is prevented by its lugs $e$ being confined between lugs $e'$ on the rear of the seat B.

The coupling-sections C C need not be constructed in the form of shells inclosing the hose and its appurtenances, but may be made in the form of levers engaging the hose and distributing-rings. Such a construction is embodied in the two modifications shown in Figs. 14 to 19.

In the construction shown in Figs. 14 to 16 the coupling-sections C C consist of levers formed each with two arms extending on opposite sides of the hose A, as shown in Fig. 16, and united at the upper end through the medium of the ring $k$, which engages the hose. Their inner ends are pivoted by pins $v$ $v$ to lugs formed on diametrically-opposite sides of the distributing-rings D D. The right-hand arm of each lever is formed with a hook $w$, extending downwardly, and a projection $w'$ above it, and with an engaging nose or beak $v'$. The left-hand arm of each lever has pivoted to it a hook or hooked link K, the hooked end of which enters the opening in the other lever when the coupling is brought together, as shown in Fig. 14. In the act of dropping the coupling this hooked end is thrust up by the hooked arm $w$ and made to engage with the beak $v'$, as shown in Fig. 15, thus drawing the coupling-seats firmly together. By suitably arranging the pivot $x$ of the link K relatively to the fulcrum of the lever C any desired degree of toggle action may be secured during the tilting movement of the levers, in order that by this movement the coupling-sections may be drawn together with a wedging effect. In automatically uncoupling, the straightening out of the hose brings the levers into line, and by the relative downward movement of the projection $w'$ the hooked end of the link is pressed down, and consequently moved out of engagement with the beak $v'$, thus disengaging the coupling-heads, which drop apart.

The modifications shown in Figs. 17 to 19 embody levers C C, of the same general construction, except that each is formed with two projecting hooked arms L L on opposite sides, engaging studs $y$ $y$ on the other lever, by which the lever is fulcrumed to the distributing-ring. The inner faces of the hooks are eccentric, so that in the downward movement from the position shown in Fig. 18 to that shown in Fig. 17 they exert a wedging thrust against the studs, which draws the two levers together.

In Figs. 14 to 19 the seats B B are held in coincidence by a projecting lug $z$, formed on one side of one seat, entering a corresponding notch formed in the correct position in the side of the opposite seat. In Figs. 17 to 19 the rings D D are held against displacement relatively to the seat by being formed with hooked fingers $g'$, which take over the seats at top and bottom, being entered into notches formed in the front faces thereof.

I have shown in the drawings four different ways for drawing together the two coupling-sections C C by their relative angular movement in the dropping of the coupling into the pendent position. All of these ways, involving the action of reciprocal wedging-faces or of links so pivoted as to be drawn tight on the principle of a reversed toggle, are in themselves old in the mechanic arts and may be varied or substituted by other known means without departing from my invention.

Any construction by which the angular movement of the two coupling sections or levers in dropping from the aligned position to the normal pendent position of the drooping lengths of hose may be substituted for the constructions shown as that element of my invention, which consists of the means for drawing the coupling-sections together.

The distributing-rings D D might be omitted without entirely departing from my invention; but this would necessitate much finer fitting of the parts in order to insure a tight joint. I do not, however, limit myself to the use of these rings, although I consider them an advantageous and desirable feature of my invention.

It will be understood that the distributing-rings D D may be connected on the one hand with the seats and on the other hand with the coupling-sections by means of any suitable pivotal or rocking connection adapted to permit the rocking of the ring sufficiently to adapt itself to want of parallelism in any direction between the coupling-section and the seat. The pivotal connections may be made by lugs or ears on the one part pivoted by a pin or pintle to lugs, ears, or other provision on the other part; but the most simple and convenient pivotal connection consists of lugs projecting from the one part and resting against the surface of the other or entering notches in the other, so as to be capable of rocking thereagainst. These lugs may project either from the distributing-ring or from the seat or coupling-section.

In case the two coupling-sections intersect, it is preferable to provide a fulcruming-pin for guiding their relative movements, such as the pins $l$ $l$; but this is not essential to my invention. Whenever the wedging or eccentric faces or other devices for drawing the coupling-sections reciprocally together are of such construction as themselves to afford a sufficient guide, the use of such guiding-pins and notches will not be necessary.

I have shown the seats B as consisting of flat disks of hard metal; but any other known construction of seat may be used—for example, a seat faced with soft composition.

Throughout this specification and claims I have used the term "hose" to indicate, essentially, a flexible pipe. The use of articulated sections of rigid piping in place of lengths of hose is already known in the art as an equivalent of such hose. Such jointed sections of pipe, constituting, essentially, flexible pipes in the sense that they permit the coupling to drop to a pendent position while coupled or locked, may be used in lieu of flexible hose and as an equivalent thereof.

I claim as my invention the following-defined novel features, substantially as hereinbefore specified, namely:

1. In a hose-coupling, the combination, with the two lengths of hose and a perpendicular seat applied to the end of each, of means for forcing the seats together, consisting of coupling-sections applied to the respective lengths of hose, movable independently of the seats, engaging each other, and adapted by a relative angular movement about a transverse axis at their intersection to draw toward each other, and engaging the seats to communicate their approaching movement thereto.

2. In a hose-coupling, the combination, with the two lengths of hose and a perpendicular seat applied to the end of each, of means for forcing the seats together, consisting of coupling-sections applied to the respective lengths of hose, movable independently of the seats, embracing the hose at their outer ends, and engaging each other at their inner ends in such manner as to draw toward each other when inclined by the dropping of the hose, and engaging the seats to communicate their approaching movement thereto.

3. In a hose-coupling, the combination, with the two lengths of hose and a perpendicular seat applied to the end of each, of means for forcing the seats together, consisting of coupling-sections applied to the respective lengths of hose, movable independently of the seats, embracing the hose at their outer ends, and provided with reciprocally-engaging wedging-faces adjacent to their inner ends, adapted by a relative angular movement of the sections about a transverse axis at their intersection to draw them toward each other.

4. In a hose-coupling, the combination, with the two lengths of hose and a perpendicular seat applied to the end of each, of means for forcing the seats together, consisting of coupling-sections applied to the respective lengths of hose, consisting, essentially, of levers adapted to interengage, movable angularly about a transverse fulcrum-axis at their intersection, constructed at their outer ends or long arms to embrace the hose and at their inner ends or short arms to engage each other in such manner as to draw together when inclined by the dropping of the hose, and connected to the seats to communicate their reciprocally-approaching thrust thereto.

5. In a hose-coupling, the combination, with the two lengths of hose and a perpendicular seat applied to the end of each, of means for forcing the seats together and distributing-rings applied around the respective hose-rings, each arranged behind its seat and between it and the forcing device and engaging them by rocking connections on relatively-perpendicular diametrical axes, whereby the pressure of the forcing devices is communicated to the seats equally at all parts thereof, thereby compensating for irregularities of fitting and wear.

6. The combination, with a hose-length, a perpendicular seat fixed to its end, and a coupling-section applied to the hose and movable independently of its seat, of a distributing-ring interposed between the section and seat, having rocking or oscillatory connections with them on diametrical axes arranged perpendicularly to one another.

7. In a hose-coupling, the combination, with the two lengths of hose and a perpendicular seat applied to the end of each, of means for forcing the seats together, consisting of coupling-sections applied to the respective lengths of hose connected to but movable independently of the seats and consisting, essentially, of levers constructed at their outer ends or long arms to embrace the hose and at their inner ends or short arms to engage each other by means of provisions adapted to be connected or disconnected when the sections are in alignment and to interengage and draw the sections together by the angular movement of the sections about a transverse fulcrum-axis at their intersection, whereby the sections are locked or wedged together while the hose is dropped into the pendent position and are automatically disengaged by the pulling of the hose taut to bring the sections into alignment.

8. The combination of hose-lengths A A, perpendicular seats B B, fixed to their respective ends, and coupling-sections C C, formed with rocking or oscillatory pivotal connections $jj$ for communicating their pressure to the seats, constructed at their outer ends to embrace the hose, adapted to intersect at their inner ends, and formed with reciprocally-engaging wedging or eccentric faces adapted on their being moved angularly by the dropping of the hose to draw the coupling-sections together and thereby press together the seats.

9. The combination of hose-lengths A A, seats B B, fixed to their respective ends, distributing-rings D D, adapted to rock against the seats, and coupling-sections C C, constructed to rock against the rings and adapted to engage each other and be drawn together by a relatively-angular movement.

10. The combination of hose-lengths A A, seats B B, applied perpendicularly to the ends thereof, and coupling-sections C C, movable independently of the seats and formed with reciprocally-interengaging arms E F, having projections $p\ q$ formed with eccentric bearing-faces adapted to wedge together by the movement of the sections from the position of alignment to a relatively angular position.

11. The combination of hose-lengths A A, seats B B, applied perpendicularly to the ends thereof, and coupling-sections C C, movable independently of the seats and formed to intersect one another, with an axial pin $l$ on one part and a notch $m$ in the other, adapted to engage at their intersection and constitute a fulcrum-connection, the axis of which is parallel with the seating-faces for guiding the sections in their relative angular movement, and the sections adapted to engage each other in such manner as to draw together by their angular movement from the position of alignment to the dropped position of the hose.

12. The combination of hose-lengths A A, seats B B, distributing-rings D D, and coupling-sections C C, adapted to interengage to draw them together, the sections and seats constructed with relatively-abutting stops for limiting the rearward movement of the sections relatively to the seats to prevent the displacement of the parts.

13. The combination of hose-lengths A A, seats B B, distributing-rings D D, and coupling-sections C C, the latter constructed to interengage and draw together, and the seats, rings, and sections formed with relatively-abutting stops adapted to limit their relative rotative or twisting movement and thereby prevent the oscillatory displacement of the parts.

14. The combination of hose-lengths A A, seats B B, distributing-rings D D, and coupling-sections C C, the latter formed with intersecting arms carrying pins entering in front of flanges on the seats, whereby the pins and flanges serve as stops for limiting the rearward movement of the coupling-sections relatively to the seats.

15. The combination of hose-lengths A A, seats B B, distributing-rings D D, formed with radial notches $d$, fastening-bands $a\,a$, engaging said notches, and coupling-sections C C, constructed to interengage and draw together and formed with rocking projections $j\,j$, engaging notches or spaces between shoulders on the equalizing-rings, whereby the rotative displacement of the rings and sections is prevented.

16. The combination of hose-lengths A A, seats B B, and coupling-sections C C, each of the latter formed on one side with the projecting arm E, having a notch $m$ and a locking projection $q$, and on the other side with an arm F, carrying a pin $l$ and formed with a locking projection $p$.

In witness whereof I have hereunto signed my name in the presence of two subscribing witnesses.

FREDERICK W. WRIGHT.

Witnesses:
ARTHUR C. FRASER,
GEORGE H. FRASER.